(12) United States Patent
Iurgel et al.

(10) Patent No.: US 11,774,574 B2
(45) Date of Patent: Oct. 3, 2023

(54) METHODS AND SYSTEM FOR DETERMINING AN ANGLE OF A DETECTION

(71) Applicant: Aptiv Technologies Limited, St. Michael (BB)

(72) Inventors: Uri Iurgel, Wuppertal (DE); Stephanie Lessmann, Erkrath (DE); Markus Stefer, Remscheid (DE)

(73) Assignee: Aptiv Technologies Limited, St. Michael (BB)

(*) Notice: Subject to any disclaimer, the term of this patent is extended or adjusted under 35 U.S.C. 154(b) by 54 days.

(21) Appl. No.: 17/584,277

(22) Filed: Jan. 25, 2022

(65) Prior Publication Data

US 2022/0236400 A1   Jul. 28, 2022

(30) Foreign Application Priority Data

Jan. 26, 2021 (EP) ..................................... 21153435

(51) Int. Cl.
*G01S 13/68* (2006.01)
*G01S 13/08* (2006.01)

(52) U.S. Cl.
CPC .............. *G01S 13/68* (2013.01); *G01S 13/08* (2013.01)

(58) Field of Classification Search
None
See application file for complete search history.

(56) References Cited

U.S. PATENT DOCUMENTS

| 2018/0024235 | A1 | 1/2018 | Hong et al. | |
| 2018/0229770 | A1* | 8/2018 | Kataoka | B62D 1/286 |
| 2019/0056506 | A1* | 2/2019 | Bialer | G01S 7/4004 |
| 2020/0059280 | A1* | 2/2020 | Thurfjell | H01Q 21/28 |
| 2021/0026003 | A1* | 1/2021 | Panzer | G01S 13/931 |
| 2021/0026006 | A1* | 1/2021 | Steiner | G01S 13/872 |
| 2022/0209396 | A1* | 6/2022 | Lee | G01S 13/42 |

FOREIGN PATENT DOCUMENTS

| CN | 107783137 A | 3/2018 |
| EP | 2983007 A1 | 2/2016 |
| EP | 3252501 A1 | 12/2017 |
| EP | 3285230 A1 | 2/2018 |

(Continued)

OTHER PUBLICATIONS

"Extended European Search Report", EP Application No. 21153435.9, dated Jun. 29, 2021, 9 pages.

(Continued)

*Primary Examiner* — Timothy A Brainard
*Assistant Examiner* — Hailey R Le
(74) *Attorney, Agent, or Firm* — Sawtooth Patent Group PLLC

(57) ABSTRACT

A computer implemented method for determining an angle of a detection comprises the following steps carried out by computer hardware components: acquiring a range rate of the detection; determining a pair of candidate angles of the detection based on the range rate; acquiring a beamvector of the detection; determining a correlation between the beamvector and a reference vector; and determining the angle of the detection based on the pair of candidate angles and based on the correlation.

20 Claims, 8 Drawing Sheets

(56) References Cited

FOREIGN PATENT DOCUMENTS

EP 3767325 A1 1/2021

OTHER PUBLICATIONS

Adolfo Di Serio, et al., "2-D MIMO Radar: A Method for Array Performance Assessment and Design of a Planar Antenna Array", IEEE Transactions on Antennas and Propagation, vol. 68, No. 6, Jun. 2020, 13 pages.
Dominik Kellner, et al., "Instantaneous Ego-Motion Estimation using Doppler Radar", Oct. 2013, 6 pages.
Dominik Kellner, et al., "Instantaneous Ego-Motion Estimation using Multiple Doppler Radars", 2014 IEEE International Conference on Robotics & Automation, 6 pages.
Dominik Kellner, et al., "Joint Radar Alignment and Odometry Calibration", Jul. 2015, 9 pages.

* cited by examiner

METHODS AND SYSTEM FOR DETERMINING AN ANGLE OF A DETECTION

CROSS-REFERENCE OF RELATED APPLICATIONS

This application claims priority to European Patent Application Number 21153435.9, filed Jan. 26, 2021, the disclosure of which is hereby incorporated by reference in its entirety herein.

BACKGROUND

Detections measured by radars contain the range rate. The range rate may be used to determine estimates for an angle of a detection. However, commonly used methods may not allow determination of a unique angle, but there may be ambiguities.

Accordingly, there is a need to provide improved angle estimation based on range rate.

SUMMARY

The present disclosure relates to methods and systems for determining an angle of a detection. The present disclosure provides a computer implemented method, a computer system, a vehicle, and a non-transitory computer readable medium according to the independent claims. Embodiments are given in the subclaims, the description, and the drawings.

In one aspect, the present disclosure is directed at a computer implemented method for determining an angle of a detection, the method comprising the following steps performed (in other words: carried out) by computer hardware components: acquiring a range rate of the detection; determining a pair of candidate angles of the detection based on the range rate; acquiring a beamvector of the detection; determining a correlation between the beamvector and a reference vector; and determining the angle of the detection based on the pair of candidate angles and based on the correlation.

In other words, a method for disambiguation of angles calculated from range rate may be provided.

The method may process radar signals from multiple antennas by calculating the angle of detection (from the combined plane) from the range rate of stationary detections.

However, it will be understood that the method may be applied to non-stationary targets, for example, if the actual object velocity vector is known from another source of information (for example from an external sensor).

Given an object (detection) that moves with a velocity vector $$\begin{pmatrix} v_{obj,x} \\ v_{obj,y} \end{pmatrix}$$

and the radar's motion vector $$\begin{pmatrix} v_x \\ v_y \end{pmatrix},$$

the radar may observe the detection from an angle θ and may measure the relative radial velocity component ṙ, i.e., the relative motion vector projected to the radial vector between the radar and the detection (at the angle θ).

The relative motion vector is $$\begin{pmatrix} v_{obj,x} \\ v_{obj,y} \end{pmatrix} - \begin{pmatrix} v_x \\ v_y \end{pmatrix}.$$

The radial vector is $$\begin{pmatrix} \cos(\theta) \\ \sin(\theta) \end{pmatrix}.$$

The projection is thus $$\begin{pmatrix} \cos(\theta) \\ \sin(\theta) \end{pmatrix} \cdot \begin{pmatrix} \cos(\theta) \\ \sin(\theta) \end{pmatrix} \cdot \left[ \begin{pmatrix} v_{obj,x} \\ v_{obj,y} \end{pmatrix} - \begin{pmatrix} v_x \\ v_y \end{pmatrix} \right]$$

which equals the range rate $$\dot{r} = \begin{pmatrix} \cos(\theta) \\ \sin(\theta) \end{pmatrix} \cdot \left[ \begin{pmatrix} v_{obj,x} \\ v_{obj,y} \end{pmatrix} - \begin{pmatrix} v_x \\ v_y \end{pmatrix} \right]$$

The classification of detections into stationary/moving (i.e., non-stationary) may be done by using a classical radar angle finding (wherein in most of the practical cases, this angle (which may be the angle of a detection that is calculated by a classical angle finding method) may be available and may be calculated by, e.g., an FFT), and/or by getting this information from an outside module or sensor (as described in more detail below), and/or by using an angle provided by another sensor (e.g., another radar, or a camera, or a lidar sensor, or any other kind of suitable sensor).

This classification may only be necessary if the detection's/object's motion vector is not known. In case the velocity vector is known, the formulas for the projection and for the range rate as described herein may be used without any restrictions and without this classification.

In another aspect, a fully stationary environment may be assumed. However, every non-stationary detection may result in a wrong angle measurement.

Commonly used angle finding methods assume a good calibration matrix C. However, it may not be possible to obtain a good calibration matrix if the method is still in the process of creating the calibration matrix (e.g. while driving). If an angle from a classical angle finding should be cross-checked for accuracy with angle from range rate, it cannot be assumed that the angle from classical angle finding is precise enough to allow disambiguation. In contrast thereto, the method, according to various embodiments, allows disambiguation. According to various embodiments, off-line calibration may be carried out at least for a respective reference position.

Compared to commonly used angle finding methods (which at least require a Fourier transform), the method, according to various embodiments, is less time consuming by determining the correlation coefficient.

According to another aspect, the detection comprises a radar detection. According to another aspect, the detection comprises a radar detection of a stationary object.

According to another aspect, the pair of candidate angles comprises two angles which are located symmetrically around a pre-determined axis. The pre-determined axis may be the x-direction (for example, defined by the forward moving direction of vehicle on which a (radar) sensor is mounted).

According to another aspect, the reference vector comprises data based on a reflection point originating from the pre-determined axis.

According to another aspect, the beamvector comprises sensor data of a plurality of antennas provided in an antenna array. According to another aspect, the antenna array is provided in a plane. There may be provided antenna arrays in more than one plane. Each antenna may belong to one or more antenna arrays.

According to another aspect, the correlation is based on a product of the beamvector and the reference vector. The product may be a dot product. The correlation may be or may include a correlation coefficient.

According to another aspect, the correlation is determined further based on a calibration matrix. The calibration matrix may be determined by solving the following equation for C: $C \cdot bv = \lambda \cdot a$, where by is the measured beamvector, $\lambda$ is a complex scaling factor, and a is the (ideal) beamvector.

According to another aspect, the computer implemented method further comprises the following step carried out by the computer hardware components: multiplying the calibration matrix with the reference vector. It has been found that, by multiplying the calibration matrix with the reference vector, the calibration matrix does not need to be multiplied with every test vector.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example, using the processing unit and the at least one memory unit.

According to another aspect, the computer system further comprises: a radar sensor configured to acquire radar measurements; wherein computer system is configured to determine the range rate based on the radar measurements; and wherein computer system is configured to determine the beamvector based on the radar measurements.

According to another aspect, the radar sensor comprises a plurality of antennas (for example an antenna array).

In another aspect, the present disclosure is directed at a vehicle, comprising: the computer system as described herein; and the radar sensor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
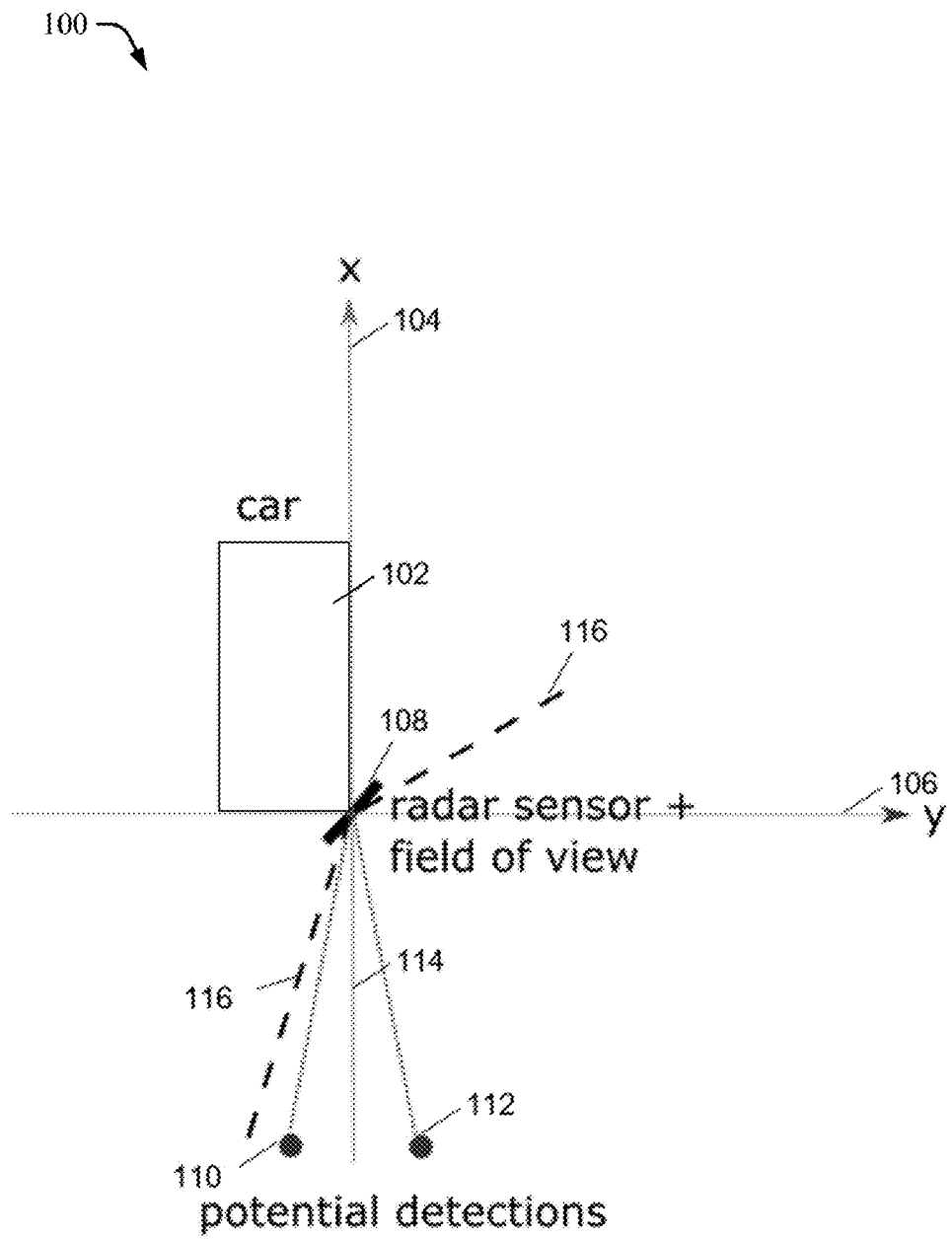
FIG. 1 an illustration of a radar scenario according to various embodiments.

Detections measured by radars may contain the range rate, which may be the radial component of the velocity of the object that caused the detection. The velocity may be relative to the radar, and the radial component may be directed from the object to the radar.

The range rate $\dot{r}$ of detections enables estimation of the angle of the detection $\theta$ if yaw rate $\omega$ and speed $v^{veh}$ of the ego vehicle are known (at the center of gravity) and the sensor mounting position relative to the center of gravity, L, is known:

$$\dot{r} = \cos(\theta + \theta_M)(v_x^{det} - v_x) + \sin(\theta + \theta_M)(v_y^{det} - v_y) \qquad (1)$$

with $$v_x = -\omega \cdot L_y + v_x^{veh} \text{ and } v_y = \omega \cdot L_x + v_y^{veh}$$

wherein $v_x$ and $v_y$ are the velocity components of the radar sensor's motion over the ground, and wherein $v_x^{det}$ and $v_y^{det}$ are the velocity of a detection. For stationary detections, $v_x^{det} = 0$ and $v_y^{det} = 0$. The velocity may be provided by another source of information (for example from an external sensor).

There are several ways for determining whether a detection is related to a stationary object. This determination is only necessary if the detection's/object's velocity is not known; in case the velocity vector is known, the formulas for the projection and for the range rate as described herein may be used without any restrictions, and then the determination whether a detection is related to a stationary object may not be necessary.

For example, it may be determined whether a detection is related to a stationary object by carrying out a check against the ego velocity in combination with a threshold. In that case, the regular signal processing to calculate the angle of a detection may be executed.

Another option for determining whether a detection is related to a stationary object may be to use outside information, e.g., from a tracker or from another sensor.

The x-axis may be oriented longitudinally in parallel through the longitudinal axis of the ego vehicle. The y-axis may be oriented in parallel to the lateral axis of the ego vehicle.

$\theta_M$ is the angle of mounting the radar in the car, i.e., the angle between the ego vehicle's longitudinal axis and the line that is perpendicular to the radar antenna surface may also be desired to be known.

Given those values and the measured range rate P of a detection, the detection's angle $\theta$ can be calculated by solving (1) for $\theta$.

$\theta$ is the angle in sensor coordinates, and $\theta^{veh} = \theta + \theta_M$ is the angle in vehicle coordinates.

The radar may also output the estimated angle of a detection that is determined by other methods not related to and independent of range rate ("classical angle finding methods").

However, the advantages of calculating the angle from the range rate according to various embodiments are, amongst others:

It can be more accurate than classical angle finding methods (depends on the accuracy of the ego velocity measurement).

Classical angle finding methods require an intrinsic calibration of each individual sensor type. Calculating angle from range rate does not require such calibration.

If the antenna disambiguation, as described below, is applied, then an antenna calibration matrix may be applied to the reference angle only but not to the beam vectors for each detection.

The determination of the angle of a detection from range rate as described above may not have a unique solution.

The reason may be that two stationary detections which are located symmetrically to the x axis, i.e., their angles are $\theta^{veh}$ and $-\theta^{veh}$, have the same range rate P. Disambiguation of the two potential angles $\pm\theta^{veh}$ is thus necessary to calculate the angle of a detection from range rate.

FIG. 1 shows an illustration 100 of a radar scenario according to various embodiments. A car 102 may define a forward axis x (104) and a lateral axis y (106). A radar sensor 108 (which may also be referred to just as "radar") is provided on the car 102. Potential detections 110 and 112 may lead to the same range rate detected by the radar sensor 108. The potential detections 110 and 112 may be symmetrical with respect to an axis 114 that may coincide with the x direction 104. A sensor Field-of-View (FoV) 116 is illustrated by dashed lines.

According to various embodiments, the beamvector of the detection whose angle is to be estimated (dis-ambiguated), $b_{test} \in \mathcal{C}^n$, may be compared to a beamvector $b_{ref} \in \mathcal{C}^n$ from a reflection point that originates from the symmetry axis, $\theta_{ref}^{veh} = 0°$. n may be the number of antenna elements. Comparison may be done by calculating and evaluating the correlation coefficient (between $b_{test}$ and $b_{ref}$). $b_{ref}$ may be an ideal (calibrated) beamvector used as a reference, i.e., it is pre-calculated and not measured. $b_{ref}$ may be the ideal beamvector for the forward (or backward) direction in the vehicle coordinate system. It may be calculated by knowing the reference angle that is to be tested against, and the ideal antenna response from a signal impinging from that angle is known. For example, for the 0° reference angle, each antenna element may have a complex value with a constant length (e.g. 1) and an angle of 0°.

$b_{ref}$ may be calculated, given the reference angle in sensor coordinates $\theta$, according to $$b_{ref} = E_0 \cdot \begin{pmatrix} 1 \\ \exp\left(-i \cdot \frac{2\pi}{\lambda}\sin(\theta)z_2\right) \\ \exp\left(-i \cdot \frac{2\pi}{\lambda}\sin(\theta)z_3\right) \\ \vdots \\ \exp\left(-i \cdot \frac{2\pi}{\lambda}\sin(\theta)z_4\right) \end{pmatrix}.$$

The value $E_0$ may represent a magnitude of the electromagnetic wave. Since only the phase information may be important, it may be set to any value, e.g., 1. The first component of $b_{ref}$ may be normalized to 1, per convention. $z_i$ may be the geometrical position of antenna i along the z axis. The z axis may be on the antenna array plane, and the first antenna may be on the origin of the z axis. The plane where the angle $\theta$ is measured may be perpendicular to the antenna array plane and parallel to the z axis. $\lambda$ may be the wavelength of the electromagnetic waves of the radar. The term $$\frac{2\pi}{\lambda}$$

may be the spatial frequency of the electromagnetic waves. When the electromagnetic wave impinges on the antenna array at an angle $\theta$, the term $\sin(\theta)$ may represent the projection of the spatial frequency on the antenna array plane.

If two angles (e.g. azimuth and elevation) should be measured instead of only one angle, the equation for f $b_{ref}$ may be extended. In this case, it may be calculated according to, for example, Adolfo Di Serio et al., 2D-MIMO Radar: A Method for Array Performance Assessment and Design of a Planar Antenna Array, IEEE TRANSACTIONS ON ANTENNAS AND PROPAGATION, Page 3.

The ideal beamvector may be perturbed using the calibration matrix to make it match with the practical sensor properties.

If the detection originates from an angle (in sensor coordinates) larger than the angle of the reference beamvector, the phase of the correlation coefficient c is positive, and, otherwise, it may be negative:

$$c = b_{ref}^H \cdot b_{test} \qquad (1)$$

$$= (\bar{b}_{ref,1} \ \bar{b}_{ref,2} \ \ldots \ \bar{b}_{ref,n}) \cdot \begin{pmatrix} b_{test,1} \\ b_{test,2} \\ b_{test,n} \end{pmatrix}$$

$$= \bar{b}_{ref,1} \cdot b_{test,1} + \bar{b}_{ref,2} \cdot b_{test,2} + \ldots + \bar{b}_{ref,n} \cdot b_{test,n}$$

The complex contribution of one element i (i.e., for one antenna i) to the correlation coefficient is $\bar{b}_{ref,i} \cdot b_{test,i}$, and its phase (angle) may be the difference between the phases of $b_{ref,i}$ and $b_{test,i}$.

Figure 2:
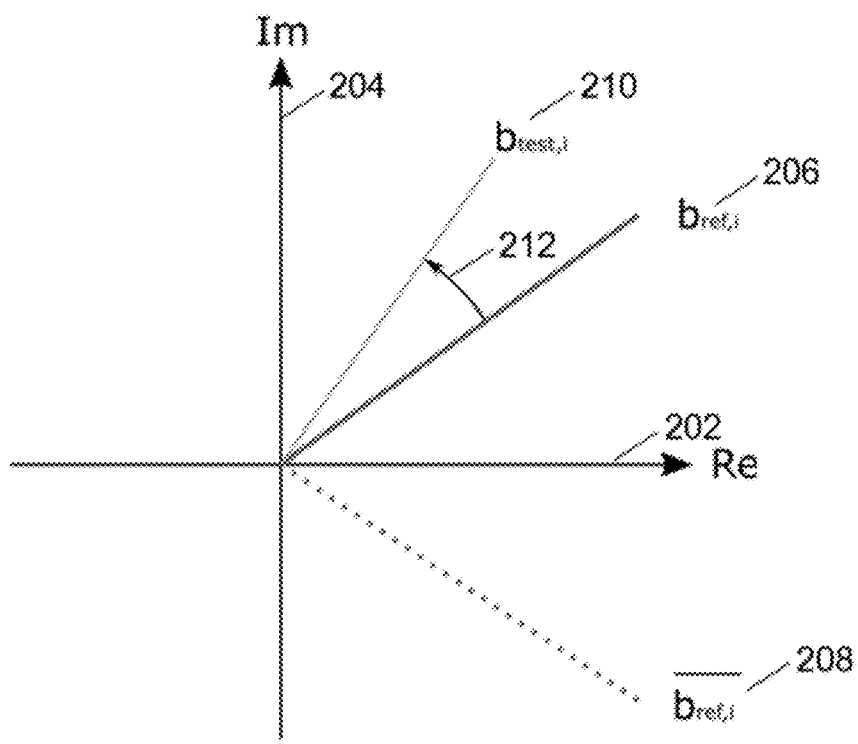
FIG. 2 an illustration of a complex plane.

FIG. 2 shows an illustration 200 of a complex plane with a real axis 202 and an imaginary axis 204. The vectors $b_{ref,i}$ 206, $\bar{b}_{ref,i}$ 208, and $b_{test,i}$ 210 are shown. The angle 212 between the phases of $b_{ref,i}$ 206 and $b_{test,i}$ 208 is also illustrated.

A pre-condition is that the phases of the elements of the beam vectors be normalized, such that the phase of the first antenna may be 0.

As a consequence, the first summand in (1) may be omitted. Since the first elements $\bar{b}_{ref,1}$ and $b_{test,i}$ may have zero phase due to normalization, their product may not change the phase of the correlation coefficient and may be omitted:

$$\text{phase}(c) = \bar{b}_{ref,2} \cdot b_{test,2} + \ldots + \bar{b}_{ref,n} \cdot b_{test,n}$$

Figure 3:
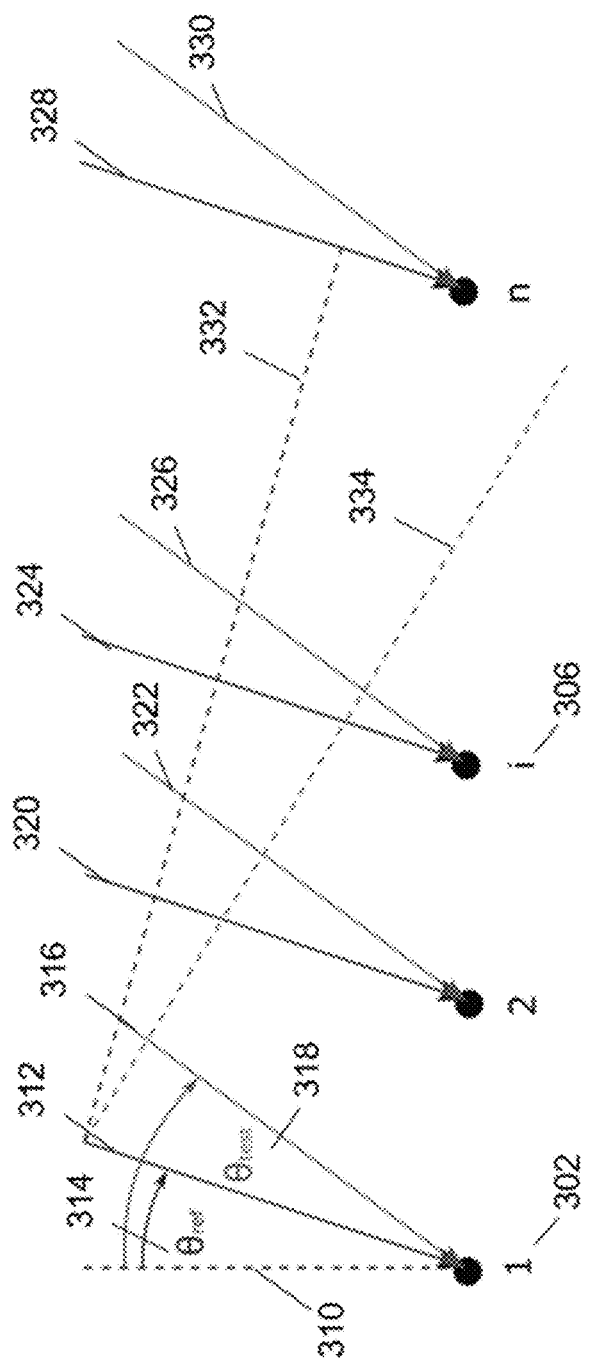
FIG. 3 an illustration of an array of antennas.

FIG. 3 shows an illustration 300 of an array of antennas with an integer number n of antennas. A first antenna 302, a second antenna 304, an i-th antenna 306, and an n-th antenna 308 are shown.

Detections under a reference angle 314 are illustrated (indicated by reference sign 312 for the first antenna 302, reference sign 320 for the second antenna 304, reference sign 324 for the i-th antenna, and reference sign 328 for the n-th antenna 308). Detections under a test angle 318 are illustrated (indicated by reference sign 316 for the first antenna 302, reference sign 322 for the second antenna 304, reference sign 326 for the i-th antenna, and reference sign 330 for the n-th antenna 308).

Dotted lines 332 and 334 denote the same phase of the incoming electromagnetic wave received by the n antenna elements 302, 304, 306, and 308.

The angles are provided with respect to a reference direction 310, for example, a forward direction of a vehicle on which the array of antennas is mounted.

As can be seen in FIG. 3, the phase difference of the reference and the test signal impinging to antenna i (306) is positive if $\theta_{test}^{veh} > \theta_{ref}^{veh}$.

Thus, each term $\bar{b}_{ref,i} \cdot b_{test,i}$ in (1) may have a positive phase contribution for $\theta_{test}^{veh} > \theta_{ref}^{veh}$ and a negative phase contribution otherwise. Consequently, the sign of the phase of the correlation coefficient c indicates from which side a detection would come from, i.e., it allows disambiguation (taking into account that $\theta_{ref}^{veh} = 0°$).

Figure 4:
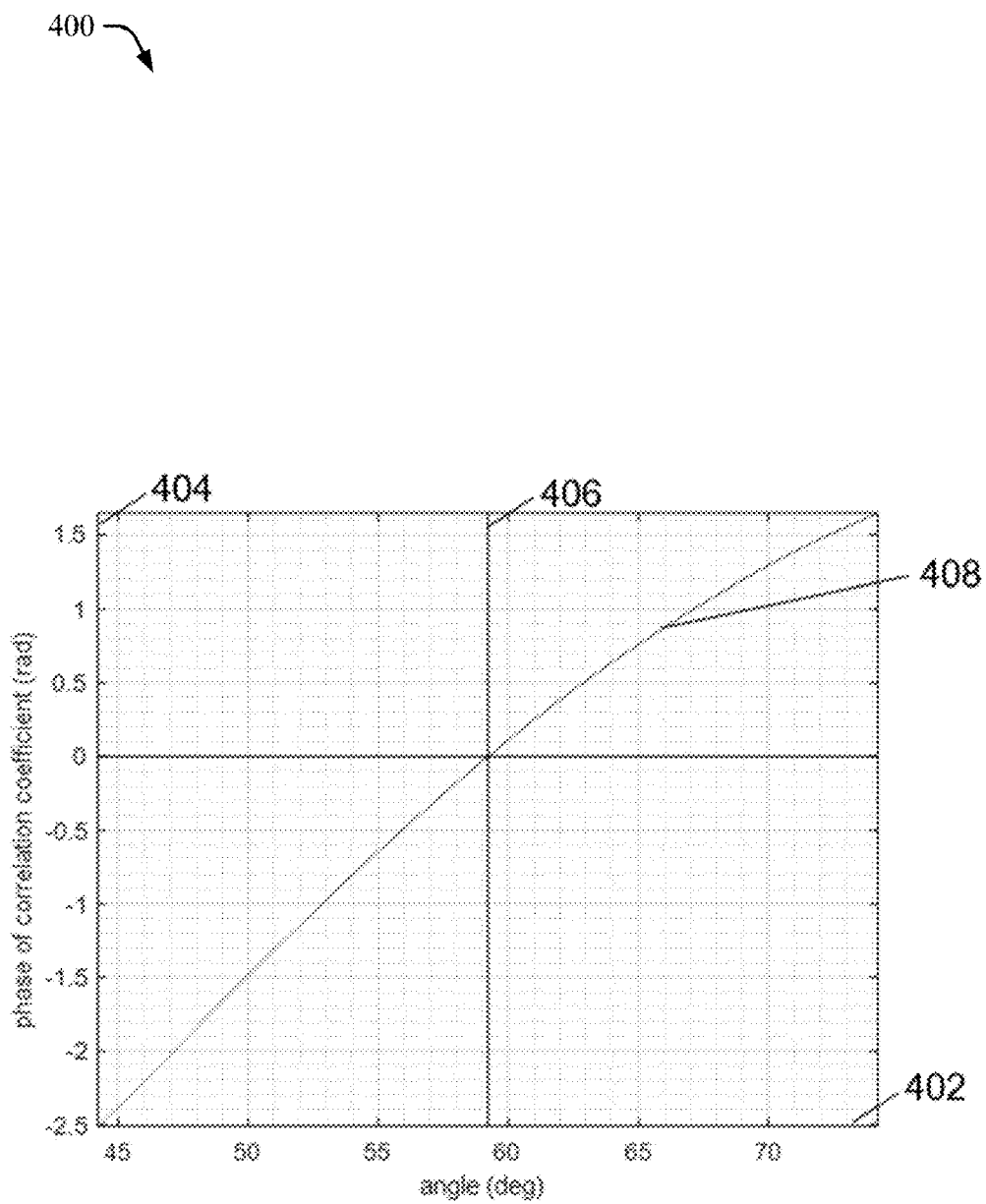
FIG. 4 a graph wherein the angle of an ideal test detection is plotted against the phase of the correlation coefficient.

FIG. 4 shows a graph 400, wherein the angle 402 of an ideal test detection is plotted against the phase 404 of the correlation coefficient resulting from a comparison to a test vector of $\theta_{ref}^{veh} = 0°$, according to (1). The angle of the detection (x-axis) is plotted in sensor coordinates, and the longitudinal axis of the vehicle, $\theta_{ref}^{veh} = 0°$, corresponds to ~59° in sensor coordinates (as indicated by vertical line 406) due to the sensor being mounted into the vehicle with a rotation of −59° (corner sensor).

As can be seen from the resulting curve 408, the sign of the phase of the correlation coefficient shows whether the detection comes from one side or the other side of the vehicle's longitudinal axis, thus allowing disambiguation.

In the following, a solution for antennas located on multiple planes (e.g. for measuring both azimuth and elevation) will be described.

In general, to measure an angle $\theta_{xy}$ that is parallel to the plane spanned by the x and the y axis, the antenna elements may be as well located on a plane P that is parallel to the plane spanned by the x and the y axis. Such a plane that is parallel to the plane spanned by the x and the y axis is henceforth called xy plane. This definition is valid also for combinations of dimensions other than xy (for example, for a xz plane spanned by the x and the z axis).

This means that if an azimuth angle $\theta_{xy}$ and an elevation angle $\theta_{xz}$ are to be measured, antenna elements may exist on an xz plane.

This poses a problem for measuring an angle $\theta_{xy}$ (azimuth) because the phase of the electromagnetic beam at an antenna element is governed by both $\theta_{xy}$ and $\theta_{xz}$ (elevation). To separate the combined influence, in order to measure an angle $\theta_{ab}$ of an ab plane (a, b being dimensions, e.g., x, z), only antenna elements may be used that lie on the same ab plane (wherein antenna elements that physically lie on different ab planes may be virtually placed such that they lie on the same ab plane, albeit while possibly introducing a measurement error). Combining elements across different ab planes (i.e., leaving a single ab plane) may introduce an unwanted coupling between the angles of the two dimensions.

As a consequence, the correlation coefficient (1) may only be calculated using antenna elements that lie on the same ab plane (if $\theta_{ab}$ is the angle to be estimated from the range rate).

Antenna elements lying on other planes may be combined into groups, where each group contains only elements from the same ab plane. Then, for each group, the beam vectors may be normalized to the first element of a group.

Figure 5:
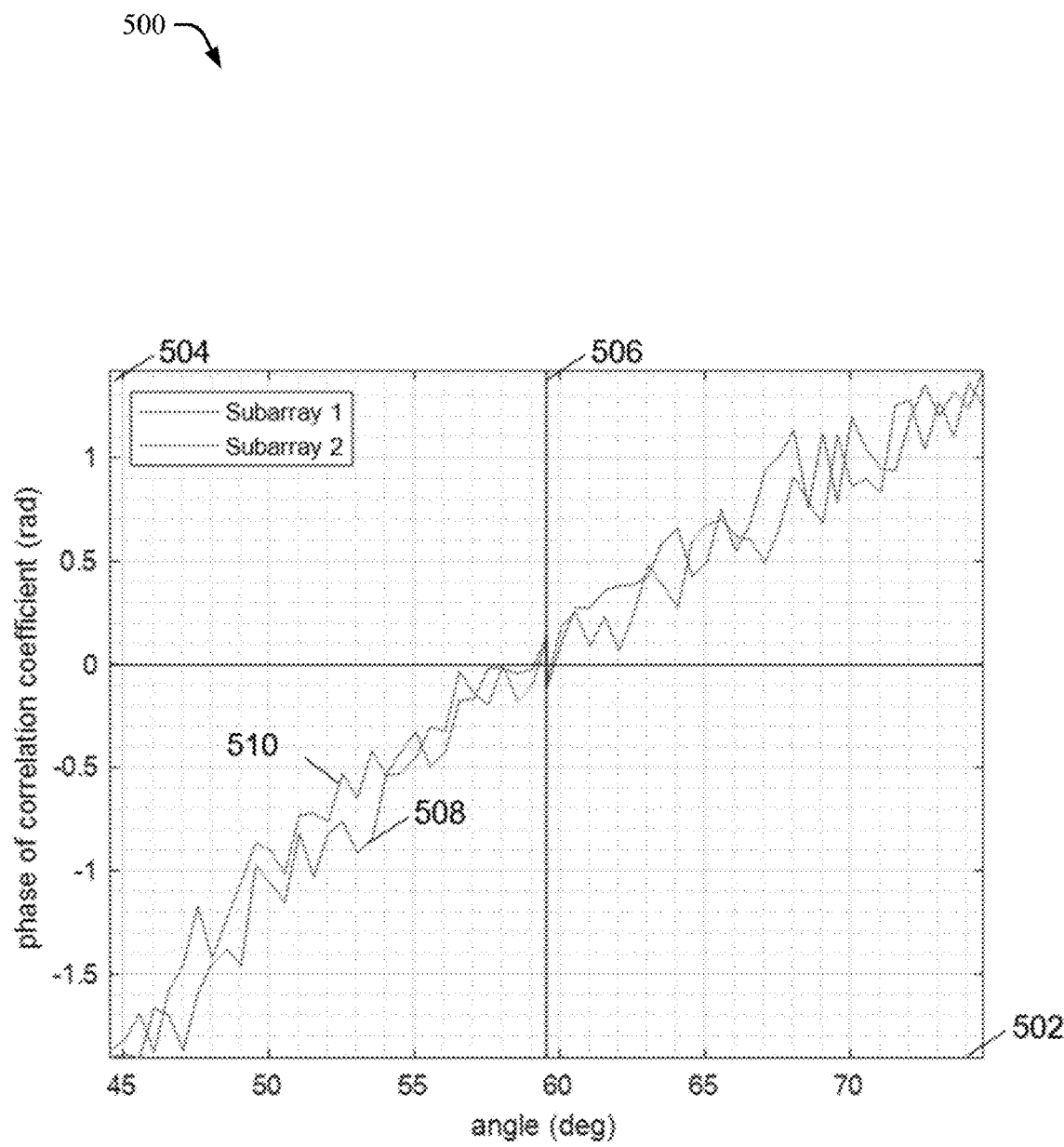
FIG. 5 an illustration of azimuth and elevation measurement.

FIG. 5 shows an illustration 500 of azimuth and elevation measurement with artificial noise of 25 dB SNR. For FIG. 5, an antenna configuration was assumed where azimuth and elevation are measured. Two sub-arrays have been simulated, and the phase of the correlation coefficient has been calculated according to (1). Additionally, white noise has been added to the antenna signals resulting in an SNR of 25 dB. The phase of correlation coefficient is illustrated on a vertical axis 504 and the angle on a horizontal axis 502. The resulting curve 508 for a first subarray and the resulting curve 510 for a second subarray are shown.

As can be seen from FIG. 5, the disambiguation of the angle is still possible, except for a very small range of angles (less than +/−0.1°) around the longitudinal axis of the vehicle, i.e., the axis defined by $\theta_{ref}^{veh} = 0°$, corresponding to ~59° in sensor coordinates (as illustrated by the vertical line 506). This is due to the sensor being mounted into the vehicle with a rotation of −59° (corner sensor).

According to various embodiments, multiplications with the calibration matrix may be provided efficiently, as will be described in the following.

The test beamvector results from applying the sensor-specific calibration matrix C to the raw measured beamvector $b_{test,raw}$ are:

$$b_{test} = C \cdot b_{test,raw}$$

This may be done for each individual beam vector to be tested.

Thus, the correlation coefficient is:

$$c = b_{ref}^H \cdot (C \cdot b_{test,raw})$$

According to various embodiments, speed may be improved by applying the calibration matrix to the reference beam vector $$c = (b_{ref}^H \cdot C) \cdot b_{test,raw}$$

and pre-calculating $b_{ref}^H \cdot C$ once. Thus, the raw test beam vector may not need to be multiplied with C, thereby saving execution time for each vector (detection) to be tested.

Figure 6:
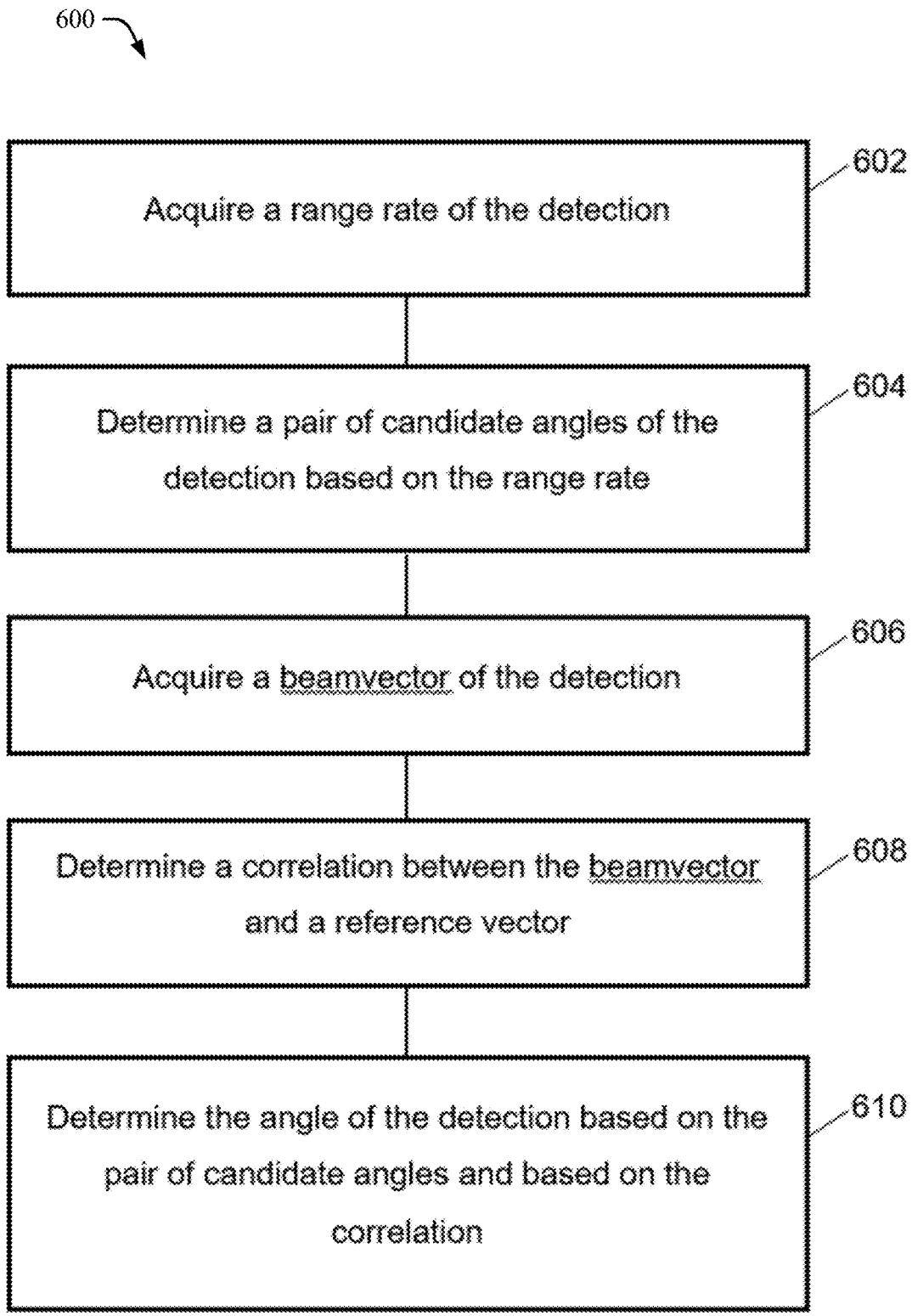
FIG. 6 a flow diagram illustrating a method for determining an angle of a detection according to various embodiments.

FIG. 6 shows a flow diagram 600 illustrating a method for determining an angle of a detection according to various embodiments. At 602, a range rate of the detection may be acquired. At 604, a pair of candidate angles of the detection based on the range rate may be determined. At 606, a beamvector of the detection may be acquired. At 608, a correlation between the beamvector and a reference vector may be determined. At 610, the angle of the detection may be determined based on the pair of candidate angles and based on the correlation.

According to various embodiments, the detection may include or may be a radar detection.

According to various embodiments, the detection may include or may be a radar detection of a stationary object.

According to various embodiments, the detection may include or may be a radar detection of a non-stationary object.

According to various embodiments, the pair of candidate angles may include or may be two angles which are located symmetrically around a pre-determined axis.

According to various embodiments, the reference vector may include or may be data based on a reflection point originating from the pre-determined axis.

According to various embodiments, the beamvector may include or may be sensor data of a plurality of antennas provided in an antenna array.

According to various embodiments, the antenna array may be provided in a plane.

According to various embodiments, the correlation may be based on a product of the beamvector and the reference vector.

According to various embodiments, the correlation may be determined further based on a calibration matrix.

According to various embodiments, the calibration matrix may be multiplied with the reference vector.

Each of the steps 602, 604, 606, 608, and 610 and the further steps described above may be performed by computer hardware components.

Figure 7:
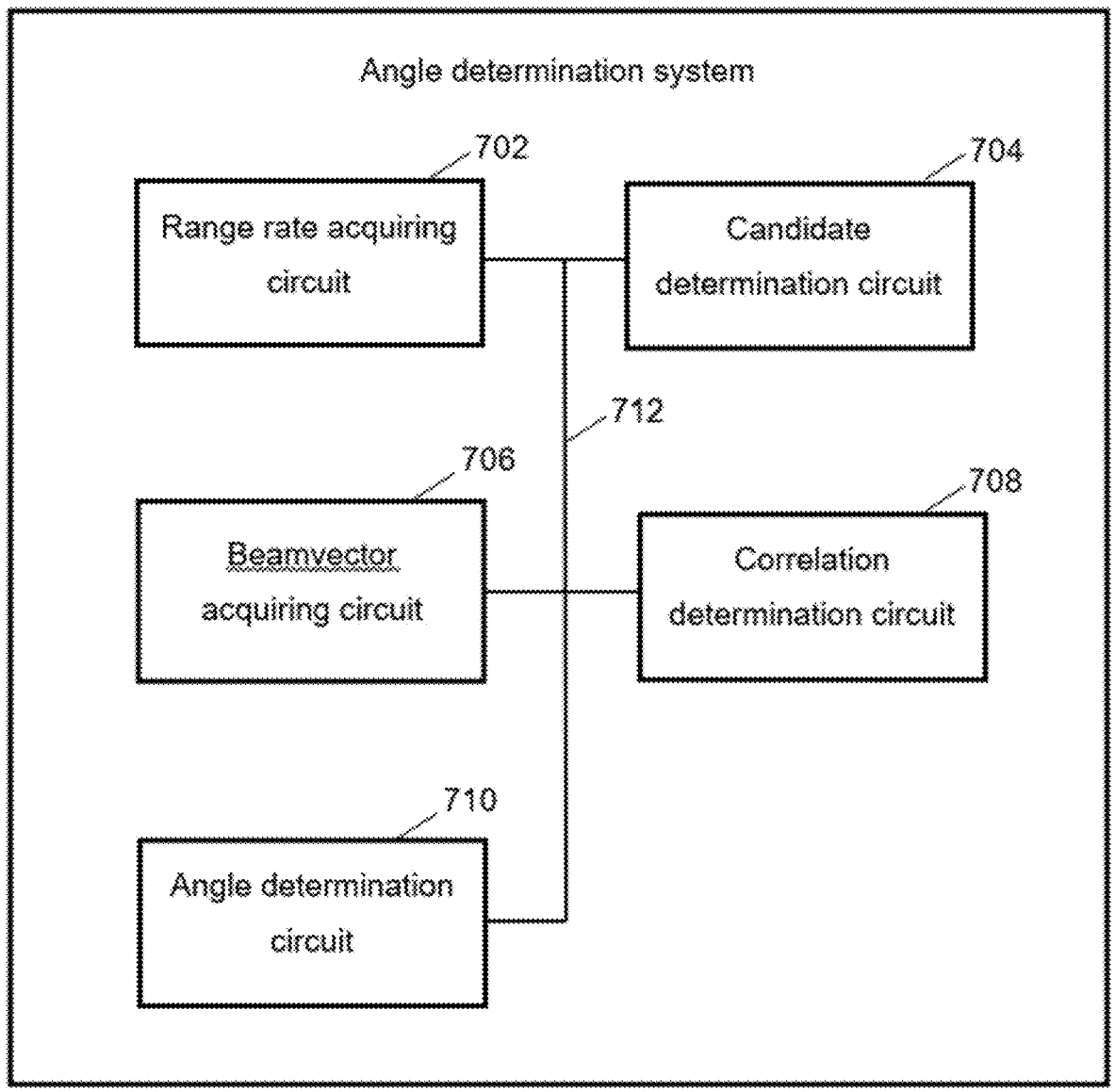
FIG. 7 an angle determination system according to various embodiments.

FIG. 7 shows an angle determination system 700 according to various embodiments. The angle determination system 700 may determine an angle of a detection and may include a range rate acquiring circuit 702, a candidate determination circuit 704, a beamvector acquiring circuit 706, a correlation determination circuit 708, and an angle determination circuit 710.

The range rate acquiring circuit 702 may be configured to acquire a range rate of the detection. The candidate determination circuit 704 may be configured to determine a pair of candidate angles of the detection based on the range rate. The beamvector acquiring circuit 706 may be configured to acquire a beamvector of the detection. The correlation determination circuit 708 may be configured to determine a correlation between the beamvector and a reference vector. The angle determination circuit 710 may be configured to determine the angle of the detection based on the pair of candidate angles and based on the correlation.

The range rate acquiring circuit 702, the candidate determination circuit 704, the beamvector acquiring circuit 706, the correlation determination circuit 708, and the angle determination circuit 710 may be coupled with each other, e.g., via an electrical connection 712, such as, e.g., a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 8:
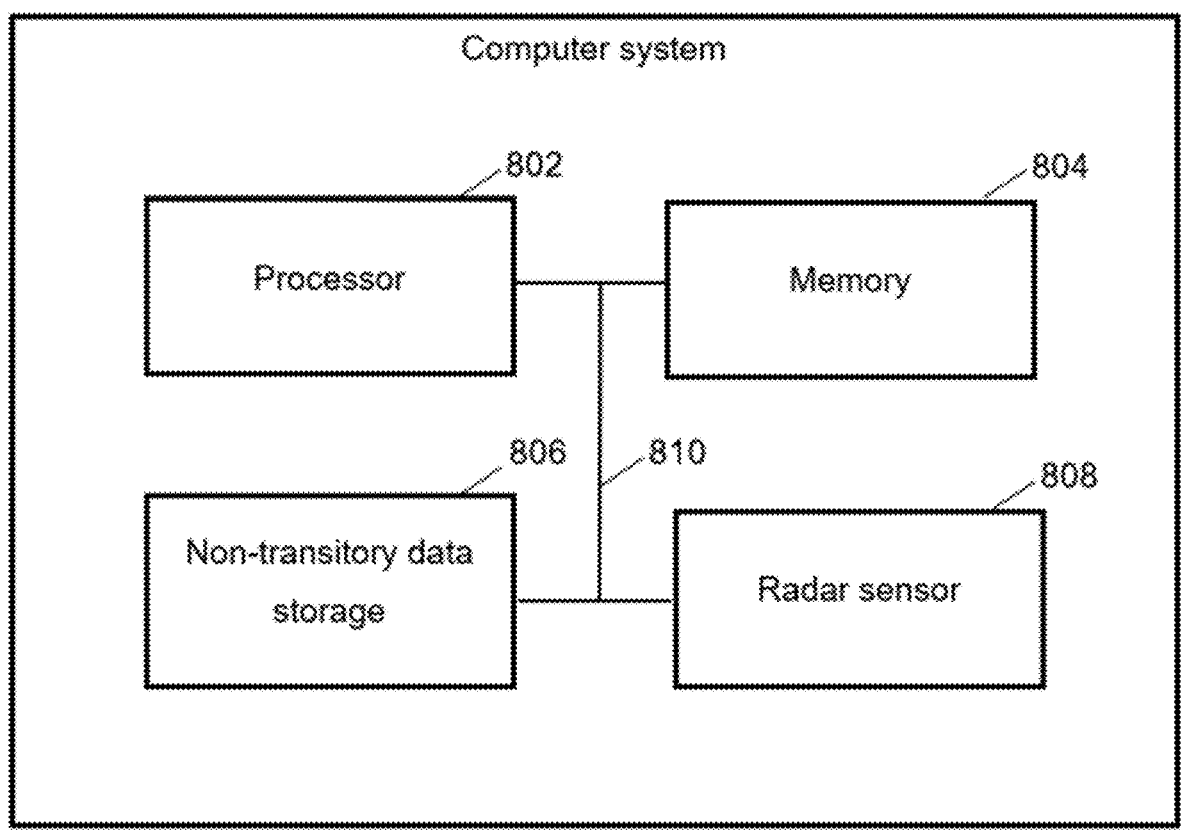
FIG. 8 a computer system with a plurality of computer hardware components configured to carry out steps of a computer implemented method for determining an angle of a detection according to various embodiments.

FIG. 8 shows a computer system 800 with a plurality of computer hardware components configured to carry out steps of a computer implemented method for determining an angle of a detection according to various embodiments. The computer system 800 may include a processor 802, a memory 804, and a non-transitory data storage 806. A radar sensor 808 may be provided as part of the computer system 800 (as illustrated in FIG. 8) or may be provided external to the computer system 800.

The processor 802 may carry out instructions provided in the memory 804. The non-transitory data storage 806 may store a computer program that includes the instructions that may be transferred to the memory 804 and then executed by the processor 802. The radar sensor 808 may be used for acquiring radar sensor data that may be used to acquire a range rate.

The processor 802, the memory 804, and the non-transitory data storage 806 may be coupled with each other, e.g., via an electrical connection 810, such as, e.g., a cable or a computer bus or via any other suitable electrical connection to exchange electrical signals. The radar sensor 808 may be coupled to the computer system 800, for example, via an external interface, or may be provided as part of the computer system (in other words: internal to the computer system, for example, coupled via the electrical connection 810).

The terms "coupling" or "connection" are intended to include a direct "coupling" (for example via a physical link) or direct "connection" as well as an indirect "coupling" or indirect "connection" (for example via a logical link), respectively.

What has been described for one of the methods above may analogously hold true for the angle determination system 700 and/or for the computer system 800.

What is claimed is:

1. A computer-implemented method for determining an angle of a detection,
the method comprising:
acquiring a range rate of the detection;
determining a pair of candidate angles of the detection that are located symmetrically around a pre-determined axis based on the range rate;
acquiring a beamvector of the detection;
determining a correlation between the beamvector and a reference vector that is based on a reflection point along the pre-determined axis; and
determining the angle of the detection based on the pair of candidate angles that are located symmetrically around the pre-determined axis and based on the correlation between the beamvector and the reference vector.

2. The computer-implemented method of claim 1, wherein the detection comprises a radar detection.

3. The computer-implemented method of claim 1, wherein the detection comprises a radar detection of a stationary object.

4. The computer-implemented method of claim 1, wherein the detection comprises a radar detection of a non-stationary object.

5. The computer-implemented method of claim 1, wherein the beamvector comprises sensor data from a plurality of antennas of an antenna array.

6. The computer-implemented method of claim 5, wherein the antenna array is planar.

7. The computer-implemented method of claim 1, wherein the correlation is based on at least one of:
a product of the beamvector and the reference vector; or
a calibration matrix.

8. The computer-implemented method of claim 7, further comprising multiplying the calibration matrix by the reference vector.

9. The computer-implemented method of claim 1, wherein the pre-determined axis is parallel to a direction of travel of the vehicle.

10. The computer-implemented method of claim 1, wherein the reference vector is parallel to the pre-determined axis.

11. The computer-implemented method of claim 1, wherein the determining of the angle of the detection is based further on a sign of a coefficient of the correlation.

12. A system comprising:
at least one processor configured to:
  acquire a range rate of a detection;
  determine a pair of candidate angles of the detection that are located symmetrically around a pre-determined axis based on the range rate;
  acquire a beamvector of the detection;
  determine a correlation between the beamvector and a reference vector that is based on a reflection point originating from the pre-determined axis; and
  determine an angle of the detection based on the pair of candidate angles that are located symmetrically around a pre-determined axis and the correlation between the beamvector and the reference vector.

13. The system of claim 12, wherein the detection comprises a radar detection of a stationary object.

14. The system of claim 12, wherein the detection comprises a radar detection of a non-stationary object.

15. The system of claim 12, wherein the beamvector comprises sensor data from a plurality of antennas of an antenna array.

16. The system of claim 15, wherein the antenna array is planar.

17. The system of claim 12, wherein the correlation is based on at least one of:
  a product of the beamvector and the reference vector; or
  a calibration matrix.

18. The system of claim 17, wherein the processor is further configured to multiply the calibration matrix by the reference vector.

19. The system of claim 12, wherein the determination of the angle of the detection is based further on a sign of a coefficient of the correlation.

20. At least one non-transitory computer readable medium comprising instructions that, when executed by at least one processor, cause the processor to:
  acquire a range rate of a detection;
  determine a pair of candidate angles of the detection that are located symmetrically around a pre-determined axis based on the range rate;
  acquire a beamvector of the detection;
  determine a correlation between the beamvector and a reference vector that is based on a reflection point originating from the pre-determined axis; and
  determine an angle of the detection based on the pair of candidate angles that are located symmetrically around the pre-determined axis and the correlation between the beamvector and the reference vector.

* * * * *